United States Patent
Card, II (10) Patent No.: US 9,032,431 B2
(45) Date of Patent: May 12, 2015

(54) SYSTEM AND METHOD FOR FILTERING BROADCAST COMMUNICATION BASED ON VIEWING CONTEXT

(75) Inventor: John A. Card, II, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 818 days.

(21) Appl. No.: 11/957,672

(22) Filed: Dec. 17, 2007

(65) Prior Publication Data

US 2009/0158313 A1 Jun. 18, 2009

(51) Int. Cl.
H04N 7/16 (2011.01)
H04N 7/10 (2006.01)
H04N 7/025 (2006.01)
H04N 21/475 (2011.01)
H04N 21/45 (2011.01)
H04N 21/454 (2011.01)

(52) U.S. Cl.
CPC ....... *H04N 21/4755* (2013.01); *H04N 21/4524* (2013.01); *H04N 21/4542* (2013.01)

(58) Field of Classification Search
CPC .......... H04N 21/4524; H04N 21/4542; H04N 21/4755
USPC .............................. 725/25, 27–29, 34–35, 26
See application file for complete search history.

(56) References Cited

U.S. PATENT DOCUMENTS

| | | | |
|---|---|---|---|
| 4,358,672 A * | 11/1982 | Hyatt et al. | 725/29 |
| 5,434,678 A | 7/1995 | Abecassis | |
| 5,583,576 A * | 12/1996 | Perlman et al. | 725/28 |
| 5,973,683 A | 10/1999 | Cragun | |
| 6,020,882 A * | 2/2000 | Kinghorn et al. | 725/28 |
| 6,208,805 B1 | 3/2001 | Abecassis | |
| 6,560,340 B1 * | 5/2003 | Akins et al. | 380/210 |
| 6,760,915 B2 * | 7/2004 | deCarmo | 725/28 |
| 6,865,746 B1 | 3/2005 | Herrington et al. | |
| 7,073,129 B1 * | 7/2006 | Robarts et al. | 709/224 |
| 7,131,133 B1 * | 10/2006 | Kawakura et al. | 725/29 |
| 7,200,852 B1 * | 4/2007 | Block | 725/28 |
| 7,406,702 B2 * | 7/2008 | Hasegawa | 725/25 |
| 7,788,686 B1 * | 8/2010 | Andrews | 725/32 |
| 7,802,278 B2 * | 9/2010 | Kweon | 725/29 |
| 2002/0056088 A1 * | 5/2002 | Silva et al. | 725/9 |
| 2003/0028652 A1 * | 2/2003 | Bardini et al. | 725/29 |
| 2003/0051238 A1 * | 3/2003 | Barone, Jr. | 725/28 |

(Continued)

FOREIGN PATENT DOCUMENTS

| | | |
|---|---|---|
| WO | WO02/021864 | 1/2002 |
| WO | WO03/065150 | 10/2003 |

OTHER PUBLICATIONS

International Search Report and Written Opinion issued Sep. 16, 2008.

(Continued)

*Primary Examiner* — Randy Flynn
(74) *Attorney, Agent, or Firm* — Ingrassia Fisher & Lorenz, P.C.

(57) ABSTRACT

A video control system for displaying video products within a current viewing context is designed to receive, via a broadcast communication, a video product and product information for the video product. The product information includes an intended viewing context for the video product. The video control system processes the product information and filters the video product based on a comparison of the intended viewing context and the current viewing context.

20 Claims, 10 Drawing Sheets

(56) References Cited

U.S. PATENT DOCUMENTS

| | | | |
|---|---|---|---|
| 2003/0125033 A1 | 7/2003 | Rindsberg | |
| 2003/0146340 A1 | 8/2003 | Ebner | |
| 2003/0192044 A1 | 10/2003 | Huntsman | |
| 2004/0015985 A1* | 1/2004 | Kweon | 725/30 |
| 2004/0261097 A1* | 12/2004 | Hanks | 725/25 |
| 2005/0060740 A1* | 3/2005 | Stecyk | 725/28 |
| 2005/0076183 A1* | 4/2005 | Medvinsky et al. | 711/163 |
| 2006/0136962 A1* | 6/2006 | Masaki | 725/28 |
| 2007/0076872 A1* | 4/2007 | Juneau | 380/202 |
| 2007/0226765 A1* | 9/2007 | Bahnck et al. | 725/63 |
| 2008/0034391 A1* | 2/2008 | Lehman et al. | 725/59 |
| 2008/0127243 A1* | 5/2008 | Furutani et al. | 725/28 |
| 2008/0228928 A1 | 9/2008 | Donelli et al. | |

OTHER PUBLICATIONS

MHP-Interative.org; "Parental Ratings;" Digital TV, DVB and ATSC Tutorials—The Interactive TV Web; Sep. 14, 2005; pp. 1-4; http://mhp-interactive.org/tutorial/dtv-intro/atsc-si/rrt.shtml.

Bary Alyssa Johnson, et al.; "V-Chip 2.0 Turns on in March;" pcmag.com; Feb. 23, 2006; pp. 1-3; http://www.pcmag.com/article2/0%2C2704%2C1930598%2C00.asp.

Federal Communications Commission; 47 CFR Ch. 1 § 15.120; Oct. 1, 2004 Edition; pp. 791-792.

USPTO "Non-Final Office Action" mailed Dec. 21, 2011; U.S. Appl. No. 11/693,065, filed Mar. 29, 2007.

USPTO "Final Office Action" mailed Jun. 13, 2012; U.S. Appl. No. 11/693,065, filed Mar. 29, 2007.

\* cited by examiner

SYSTEM AND METHOD FOR FILTERING BROADCAST COMMUNICATION BASED ON VIEWING CONTEXT

BACKGROUND

A variety of broadcast technologies, such as cable and satellite broadcasting, have developed to deliver a wide variety of video products to consumers. Broadcasters commonly transmit thousands of video products over hundreds of channels to consumers. As a result, consumers are frequently presented with a very large spectrum of content which can range from content that is suitable for children to other content that is only appropriate for adult audiences. Discriminating between the various video products in order to avoid objectionable content can be a daunting task.

To assist consumers with navigating such a large spectrum of content, a national content rating system was created to assign a content rating to each video product transmitted by a broadcaster. The content rating includes a content label and an audience label. The content label informs consumers about the type of content, such as violence, nudity, or strong language, contained in a given video product. The audience label indicates a suggested audience for the video product.

Presently, video distributors, such as movie or television studios, determine the content ratings for the video products they produce. The content rating of each video product is then broadcast to the consumer along with the video product. Consumers can program receiving equipment to filter each video product based on the content rating of each video product. For example, a consumer may set his receiver to block all video products that contain violence. The receiver then either blocks or allows each video product based on whether or not the content rating associated with each video product indicates violence.

Consumers are not fully satisfied with the current rating system and the attendant filtering capabilities included with most broadcast receiver systems. To the dissatisfaction of many consumers, content ratings can be very inconsistent. In some cases, consumers simply disagree with the content ratings as determined by the video distributors. Current filtering mechanisms do not allow consumers to account for the vagaries of the present content rating process.

In one problem, distributors may determine and apply a content rating to a video product in view of the sensibilities of a particular consumer group. However, many video products are available to a wide range of consumer groups that have a wide range of sensibilities. While a particular consumer group may agree with a content rating as applied to a video product, other consumer groups may disagree with the content rating.

In one example, a video distributor may produce a video product intended for broadcast within a particular region. The video distributor may rate the video product in view of the general political or cultural sensibilities or tastes of the people in that region. However, the video product might simultaneously or later be broadcast to other regions that do not share the same sensibilities or tastes as the intended region. For instance, one region for which a video product is intended may have less strict cultural sensibilities than another region. A video distributor may assign a lenient rating to a video product in view of the tastes of the intended viewing region. However, the video product could be broadcast to both regions. In such circumstances, the video product may carry a less stringent content rating than would otherwise be assigned if the video product were intended for the other region. As a result, a receiver set to filter video products with more stringent content ratings will allow the video product with the less stringent content rating, even though the content within the video product may be objectionable to viewers in the other region.

In another problem, it is common for video distributors to determine and apply content ratings stringently to video products intended for viewing during the traditional family viewing hour. However, it is also common for video distributors to determine and apply content ratings less stringently to video products intended for later viewing times, such as the traditional adult prime-time viewing hour. Unfortunately, video products that are intended for later viewing hours are frequently available to consumers during earlier times of the day.

In one example, a video product that is intended for viewing during the adult prime-time viewing hour in one time zone may be simultaneously broadcast to viewers in an earlier time zone during their traditional family viewing hour. In another example, a video product that was originally intended for viewing during the adult prime-time viewing hour may be broadcast in syndication during an earlier viewing hour. In each example, the video product may carry a less stringent content rating than would otherwise be assigned if the video product had been intended for viewing during the earlier hour. As a result, a receiver set to filter video products with more stringent content ratings will allow the video product with the less stringent content rating, even though the content within the video product may be objectionable within the context of the earlier viewing hour.

In view of the limitations of current content rating schemes and filtering capabilities, improved filtering is desired.

DETAILED DESCRIPTION

Figure 1:
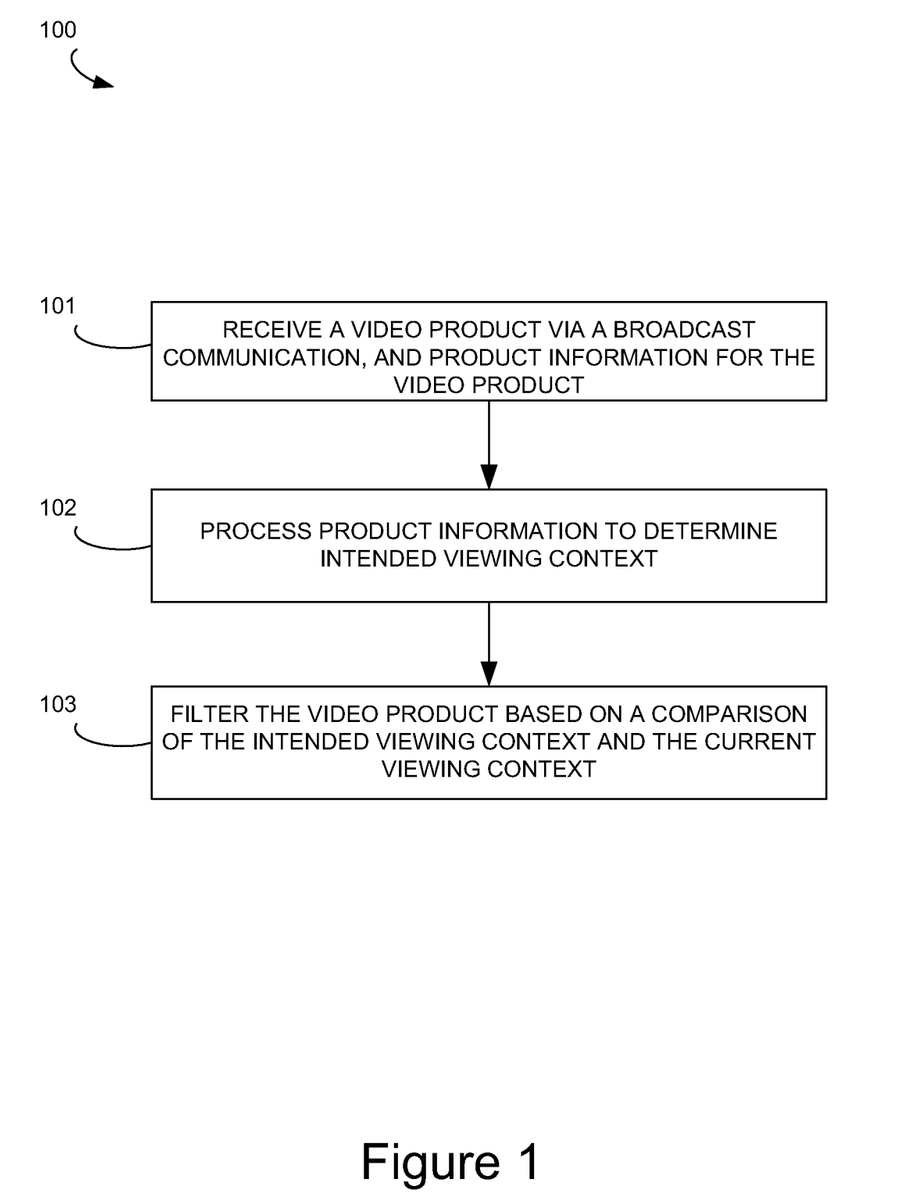
FIG. 1 is a flow diagram of a method according to an embodiment of the invention.

FIG. 1 provides a flow diagram of a method 100 for operating a video control system in an embodiment of the invention. In the method 100, a video control system receives a video product via a broadcast communication and product information for the video product (Operation 101). The product information for the video product may be embedded within the broadcast communication or may come from a wide variety of sources other than the broadcast communication, all within the scope of the present invention. The video control system processes the product information to determine an intended viewing context for the video product (Operation 102). The video control system then filters the video product based on a comparison between the intended viewing context and a current viewing context (Operation 103).

In one example, the video control system could allow the video product to be displayed if the intended viewing context is the same as or satisfies the current viewing context. The video system could block the video product from being displayed if the intended viewing context is not the same as or does not otherwise satisfy the current viewing context.

Figure 2:
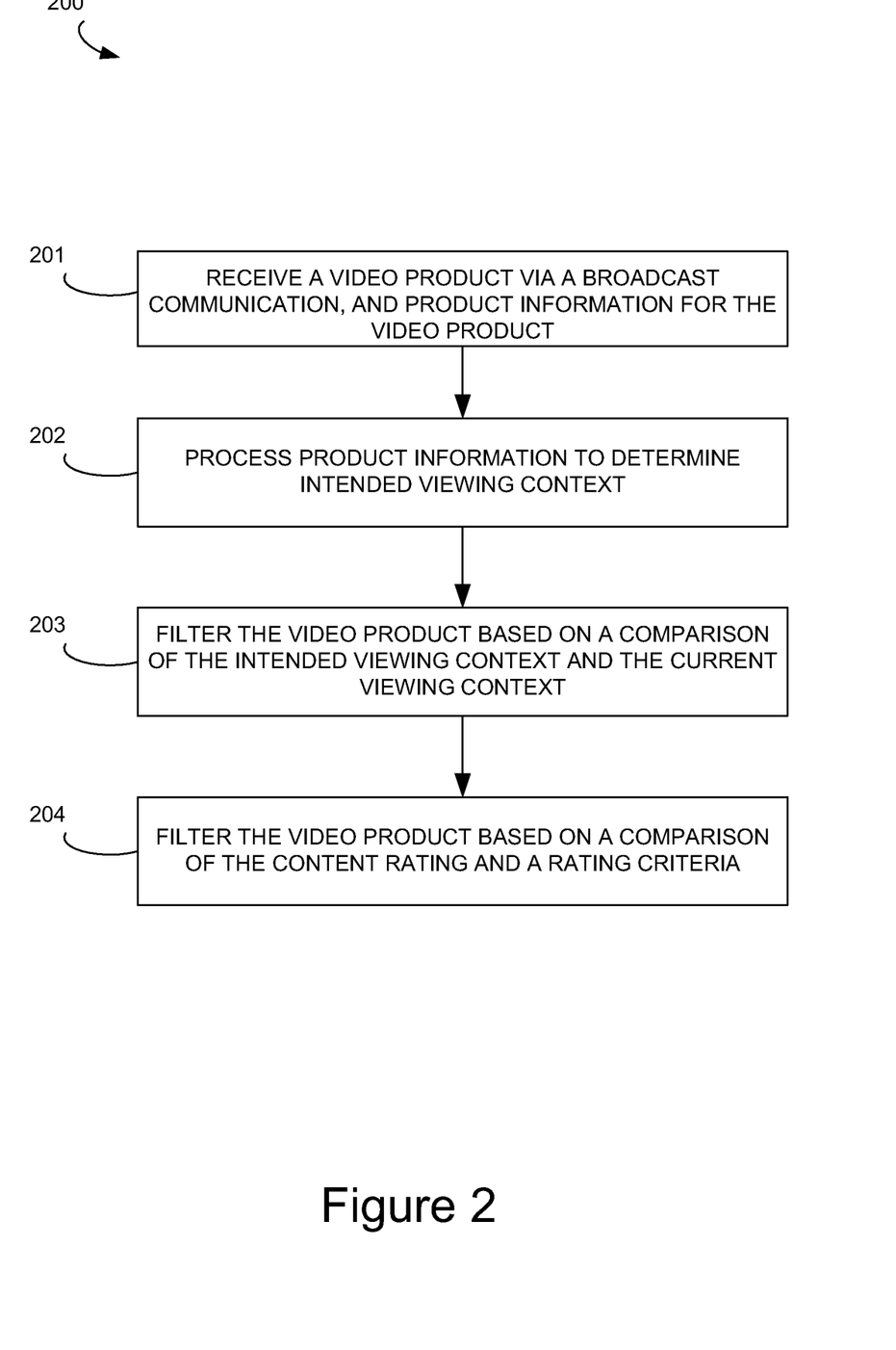
FIG. 2 is a flow diagram of a method according to an embodiment of the invention.

In another embodiment, FIG. 2 provides a flow diagram of a method 200 for operating a video control system in an embodiment of the invention. In the method 200, a video control system receives a video product via a broadcast communication, and product information for the video product (Operation 201). The product information for the video product may be embedded within the broadcast communication or may come from a wide variety of sources other than the broadcast communication, all within the scope of the present invention. The video control system processes the product information to determine an intended viewing context and content rating for the video product (Operation 202). The video control system then filters the video product based on a comparison between the intended viewing context and a current viewing context (Operation 203). If the intended viewing context is the same as or satisfies the current viewing context, the video control system filters the video product based on a comparison of a content rating associated with the video product and a content criteria set by a user (Operation 204). For example, users may wish to avoid all violent programming, so they would set their content criteria to avoid such programming. If the intended viewing context is not the same as or does not otherwise satisfy the current viewing context, the video system could block the video product from being displayed. If the content rating satisfies the rating criteria, the video control system could allow the video product to be displayed.

Figure 3:
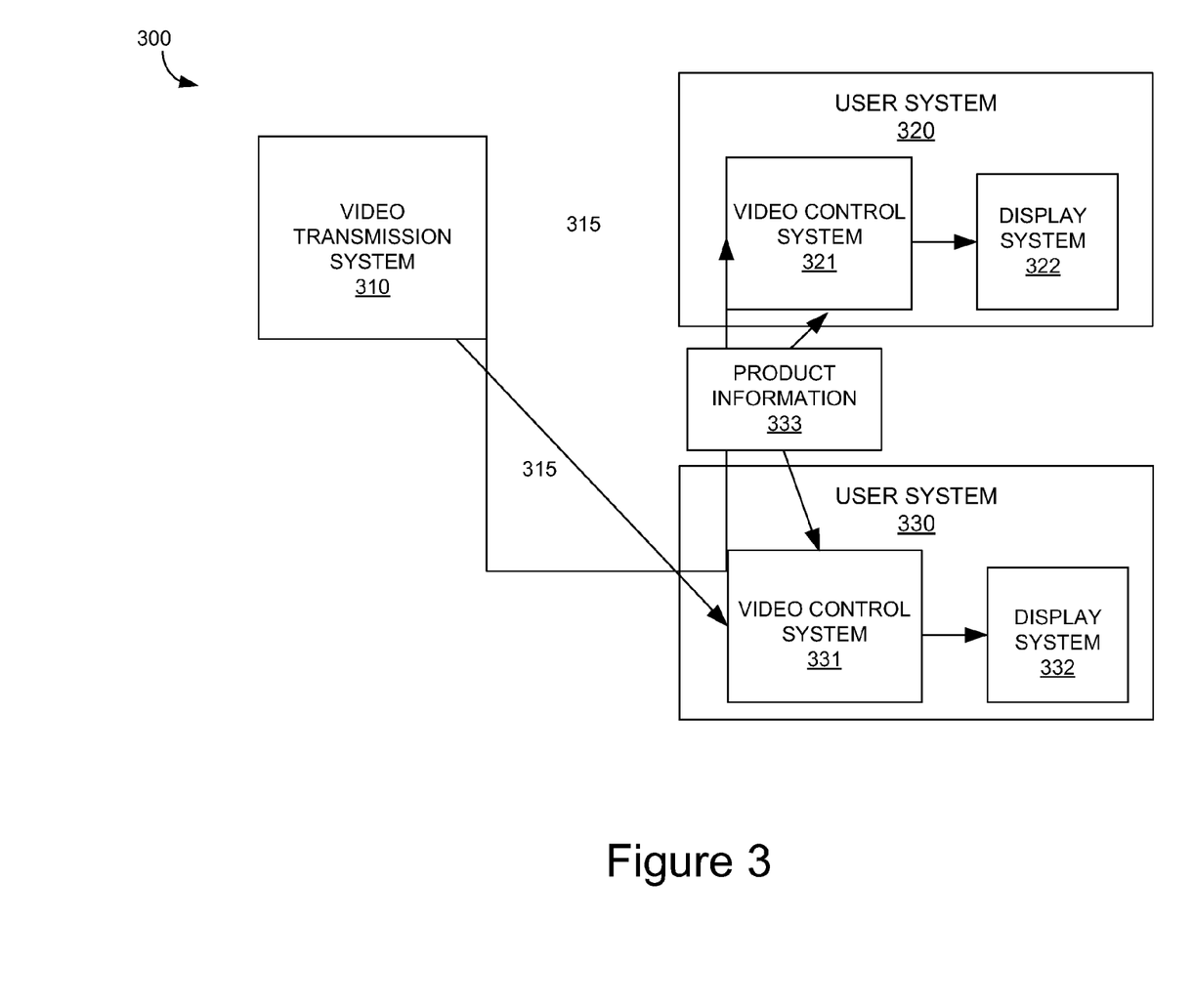
FIG. 3 is a block diagram of a broadcast communication network in an embodiment of the invention.

In another embodiment, a broadcast communication network 300 is shown in FIG. 3. Broadcast communication network 300 includes video transmission system 310, user system 320, and user system 330. User system 320 includes video control system 321 and display system 322. User system 330 includes video control system 331 and display system 332.

In operation, video transmission system 310 transmits or broadcasts a broadcast communication 315 to user systems 320 and 330. Broadcast communication 315 could include video products and product information associated with the video products.

Video control systems 321 and 331 receive and process broadcast communication 315 to filter the video products based on the product information associated with the video products. If video products are allowed, video control systems 321 and 331 transfer the video products to display system 322 and 332 for display. If the video products are not allowed, video control systems 321 and 331 block, or otherwise filter, the video products. This filtering of video products may include a variety of actions within the scope of the present invention. For example, some filters may block video portions of a broadcast while allowing audio portions of the broadcast to be heard. The filter may act to time shift a program such that it plays at a future date or time. Those of skill in the art will recognize that any of these and other methods of filtering may be used within the scope of the present invention.

The following describes the operation of video control system 321 in more detail. It should be understood that video control system 331 could operate as described for video control system 321.

In this embodiment, video control system 321 receives the broadcast communication 315 that carries a video product and, optionally, product information for the video product. Video product information 333 may be obtained from a wide variety of sources as discussed in further detail below, all within the scope of the present invention. Video control system 321 processes the product information to determine an intended viewing context for the video product. Video control system 321 then filters the video product based on a comparison between the intended viewing context and a current viewing context.

In one example, video control system 321 could allow the video product to be displayed by display 322 if the intended viewing context is the same as or satisfies the current viewing context. Video control system 321 could block the video product from being displayed by display 322 if the intended viewing context is not the same as or does not otherwise satisfy the current viewing context.

In another example, if the intended viewing context is the same as or satisfies the current viewing context, video control system 321 could additionally filter the video product based on a comparison of a content rating associated with the video product and a content criteria set by a user.

Figure 4:
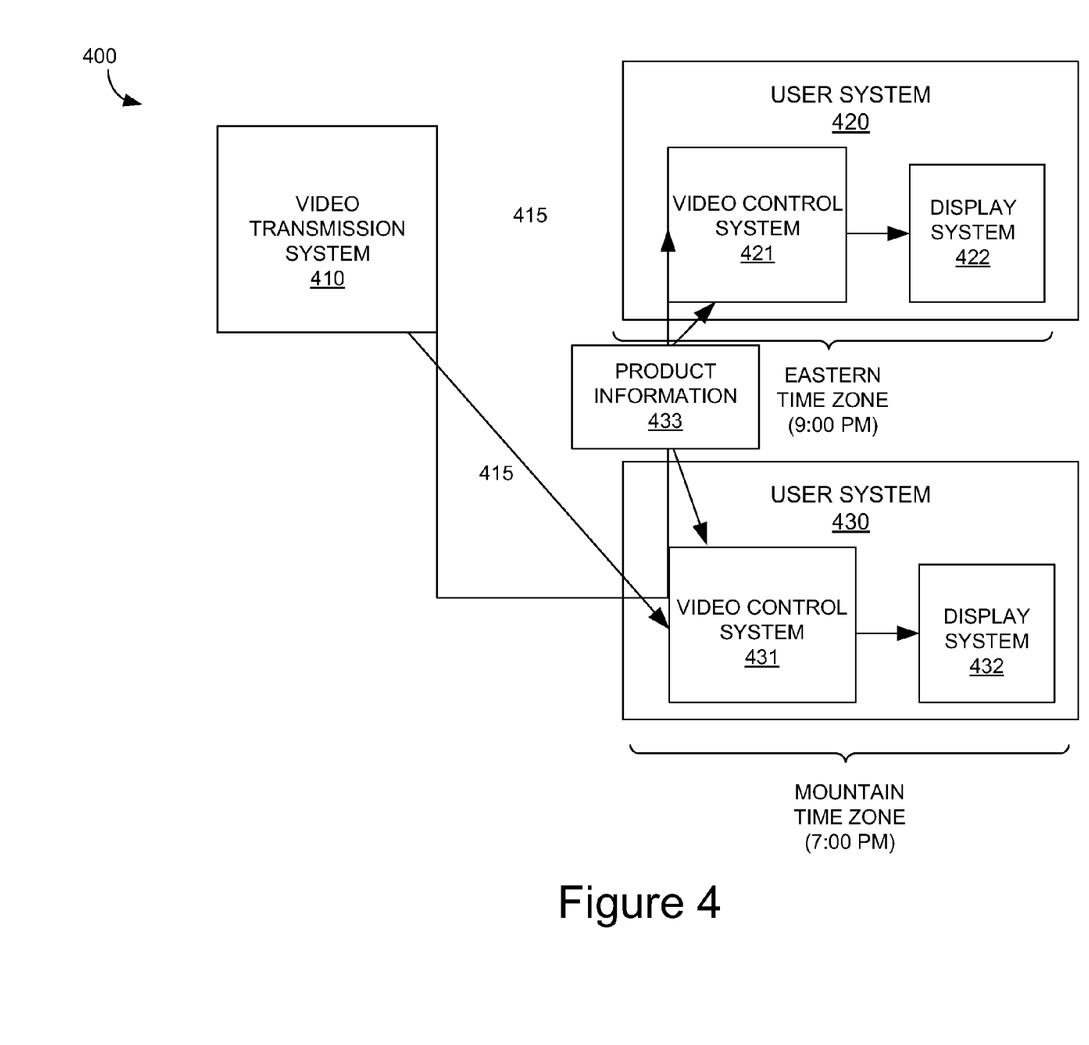
FIG. 4 is a block diagram of a broadcast communication network in an embodiment of the invention.

In another embodiment, FIG. 4 illustrates a broadcast communication network 400. Broadcast communication network 400 includes video transmission system 410, user system 420, and user system 430. User system 420 includes video control system 421 and display system 422. User system 430 includes video control system 431 and display system 432.

In operation, video transmission system 410 transmits or broadcasts a broadcast communication 415 to user systems 420 and 430. Broadcast communication 415 could include video products and product information associated with the video products.

Video control systems 421 and 431 receive and process broadcast communication 415 to filter the video products based on the product information 433 associated with the video products. If video products are allowed, video control systems 421 and 431 transfer the video products to display system 422 and 432 respectively for display. If the video products are not allowed, video control systems 421 and 431 block, or otherwise filter, the video products.

For exemplary purposes, FIG. 4 shows that user system 420 is located in the Eastern Time zone, whereas user system 430 is located in the Mountain Time zone. As further illustrated by FIG. 4, the time in the Eastern Time zone is 9:00 PM, while the time in the Mountain Time zone is 7:00 PM. Thus, the Mountain Time zone is two hours later than or behind the Eastern Time zone.

The following describes the operation of video control system 421 in more detail. It should be understood that video control system 431 could operate as described for video control system 421.

In this embodiment, video control system 421 receives the broadcast communication 415 that carries a video product and product information for the video product. Video control system 421 processes the product information to determine an intended viewing context for the video product. In this embodiment, the intended viewing context is an intended local time for viewing the video product.

Video control system 421 could determine the intended local viewing time in a variety of ways. In one example, the product information associated with the video product could indicate the intended local viewing time. In another example, the product information could indicate a channel on which the video product is to be displayed. The channel could be associated with a particular time zone. For instance, many video products are distributed by distributors, such as HBO, who may have separate west coast channels and east coast channels in an attempt to provide family safe programming during the days, and more mature programming at night. Since the west coast and east coast are three hours apart (and Hawaii is even further out), it would be difficult for a single channel to switch from family to mature programming at a single instant across the nation. (This problem is even more severe for international networks.) By providing multiple feeds (possibly of the exact same programming but time shifted) distributors are able to tailor their programming for different regions of the country, and the video control system provides filtering to prevent mature programming from appearing on a user's display at an inappropriate time, given the user's time zone.

Figure 5:
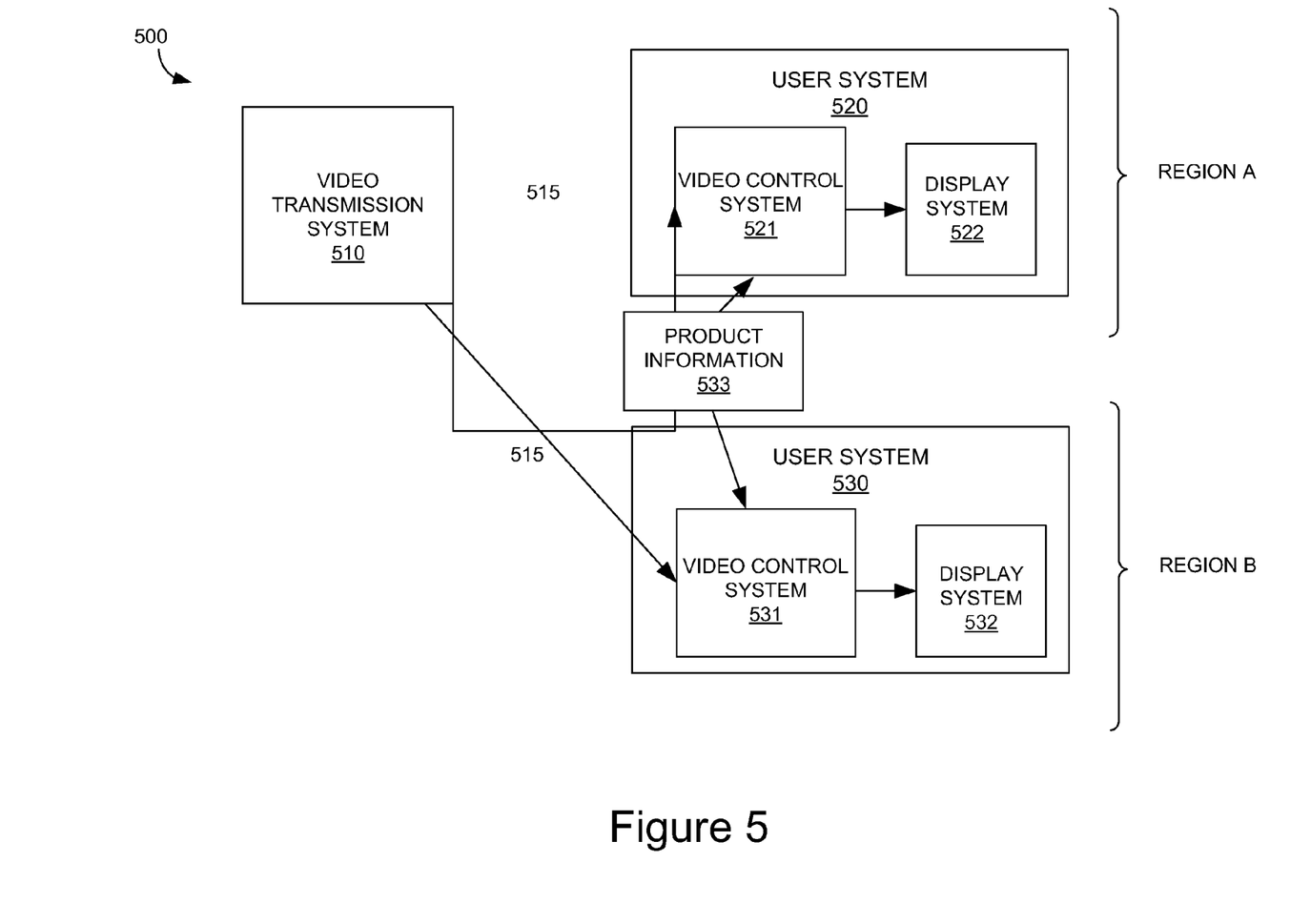
FIG. 5 is a block diagram of a broadcast communication network in an embodiment of the invention.

In another embodiment, FIG. 5 illustrates a broadcast communication network 500. Broadcast communication network 500 includes video transmission system 510, user system 520, and user system 530. User system 520 includes video control system 521 and display system 522. User system 530 includes video control system 531 and display system 532.

In operation, video transmission system 510 transmits or broadcasts a broadcast communication 515 to user systems 520 and 530. Broadcast communication 515 could include video products and product information associated with the video products.

Video control systems 521 and 531 receive and process broadcast communication 515 to filter the video products based on the product information 533 associated with the video products. If video products are allowed, video control systems 521 and 531 transfer the video products to display system 522 and 532 respectively for display. If the video products are not allowed, video control systems 521 and 531 block, or otherwise filter, the video products.

For exemplary purposes, FIG. 5 shows that user system 520 is located in Region A, whereas user system 530 is located in the Region B. These two locations may be within the same time zone, but have widely varying expectations for programming content. For example, Region A might correspond to the Northeastern United States, and Region B might correspond to the Southern United States. These two regions share time zones, but their expectations about allowable programming content may greatly differ.

The following describes the operation of video control system 521 in more detail. It should be understood that video control system 531 could operate as described for video control system 521.

In this embodiment, video control system 521 receives the broadcast communication 515 that carries a video product and product information for the video product. Video control system 521 processes the product information to determine an intended viewing context for the video product. In this embodiment, the intended viewing context is an intended region for viewing the video product.

Video control system 521 could determine the intended local region in a variety of ways. In one example, the product information associated with the video product could indicate the intended viewing region. In another example, the product information could indicate a channel on which the video product is to be displayed. The channel could be associated with a particular region. For instance, some religious or ethnic groups may be concentrated in particular areas of the country. By specifying an intended viewing region in the product information, content producers may tailor programming to that particular viewing region, and more closely target their intended audiences. In still another example, this product information including intended viewing region may be used to divide the country up into local viewing regions each weekend in the fall during football season. This would allow more accurate targeting of the fans of each NFL or college team. The video control systems 521 and 531 could determine their current viewing region through either the user's phone number or billing address, or any other method, and compare the current viewing location to the intended viewing region in filtering the programming products.

Figure 6:
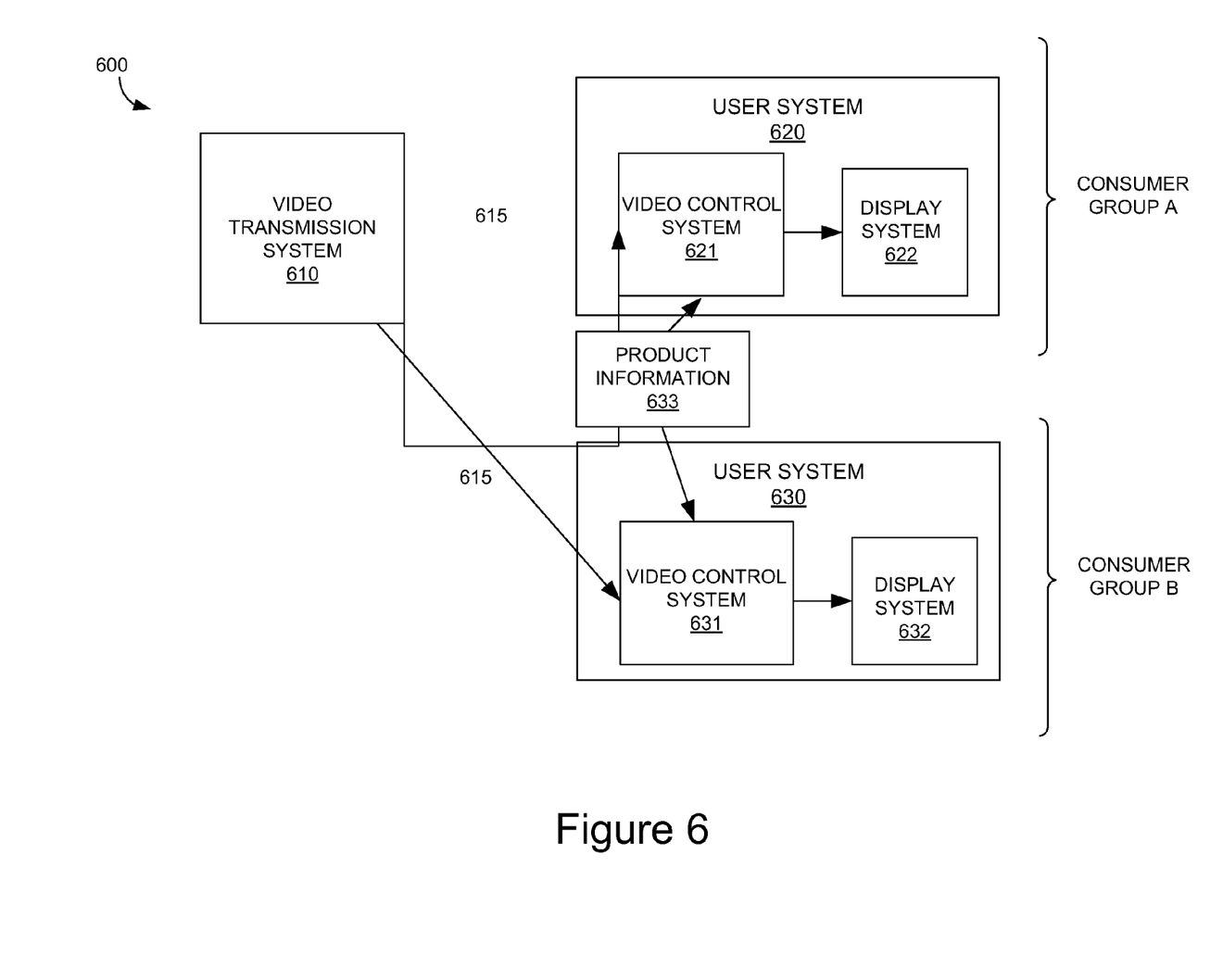
FIG. 6 is a block diagram of a broadcast communication network in an embodiment of the invention.

In a further embodiment, FIG. 6 illustrates a broadcast communication network 600. Broadcast communication network 600 includes video transmission system 610, user system 620, and user system 630. User system 620 includes video control system 621 and display system 622. User system 630 includes video control system 631 and display system 632.

In operation, video transmission system 610 transmits or broadcasts a broadcast communication 615 to user systems 620 and 630. Broadcast communication 615 could include video products and product information associated with the video products.

Video control systems 621 and 631 receive and process broadcast communication 615 to filter the video products based on the product information 633 associated with the video products. If video products are allowed, video control systems 621 and 631 transfer the video products to display system 622 and 632 respectively for display. If the video products are not allowed, video control systems 621 and 631 block, or otherwise filter, the video products.

For exemplary purposes, FIG. 6 shows that user system 620 is a member of Consumer Group A, whereas user system 630 is a member of Consumer Group B. These two consumer groups may be within the same time zone, but have widely varying expectations for programming content. For example, young male viewers most likely are uninterested in programming directed to pregnant women and may wish to set their local viewing context to avoid seeing such programming.

The following describes the operation of video control system 621 in more detail. It should be understood that video control system 631 could operate as described for video control system 621.

In this embodiment, video control system 621 receives the broadcast communication 615 that carries a video product and product information for the video product. Video control system 621 processes the product information to determine an intended viewing context for the video product. In this embodiment, the intended viewing context is an intended consumer group for viewing the video product.

Video control system 621 could determine the intended consumer group in a variety of ways. In one example, the product information associated with the video product could indicate the gender, age, education, or other characteristic of the intended consumer group. In another example, the product information could indicate a channel on which the video product is to be displayed. The channel could be associated with a particular consumer group. For instance, some religious or ethnic groups may have specialized programming available on specific channels. By specifying an intended consumer group in the product information, content producers may tailor programming to that particular group, and more closely target their intended audiences for their advertising and programming. The video control systems 621 and 631 could determine their current consumer group through either the user's identity, or any other method, and compare the current viewing consumer group to the intended viewing consumer group in filtering the programming products.

Figure 7:
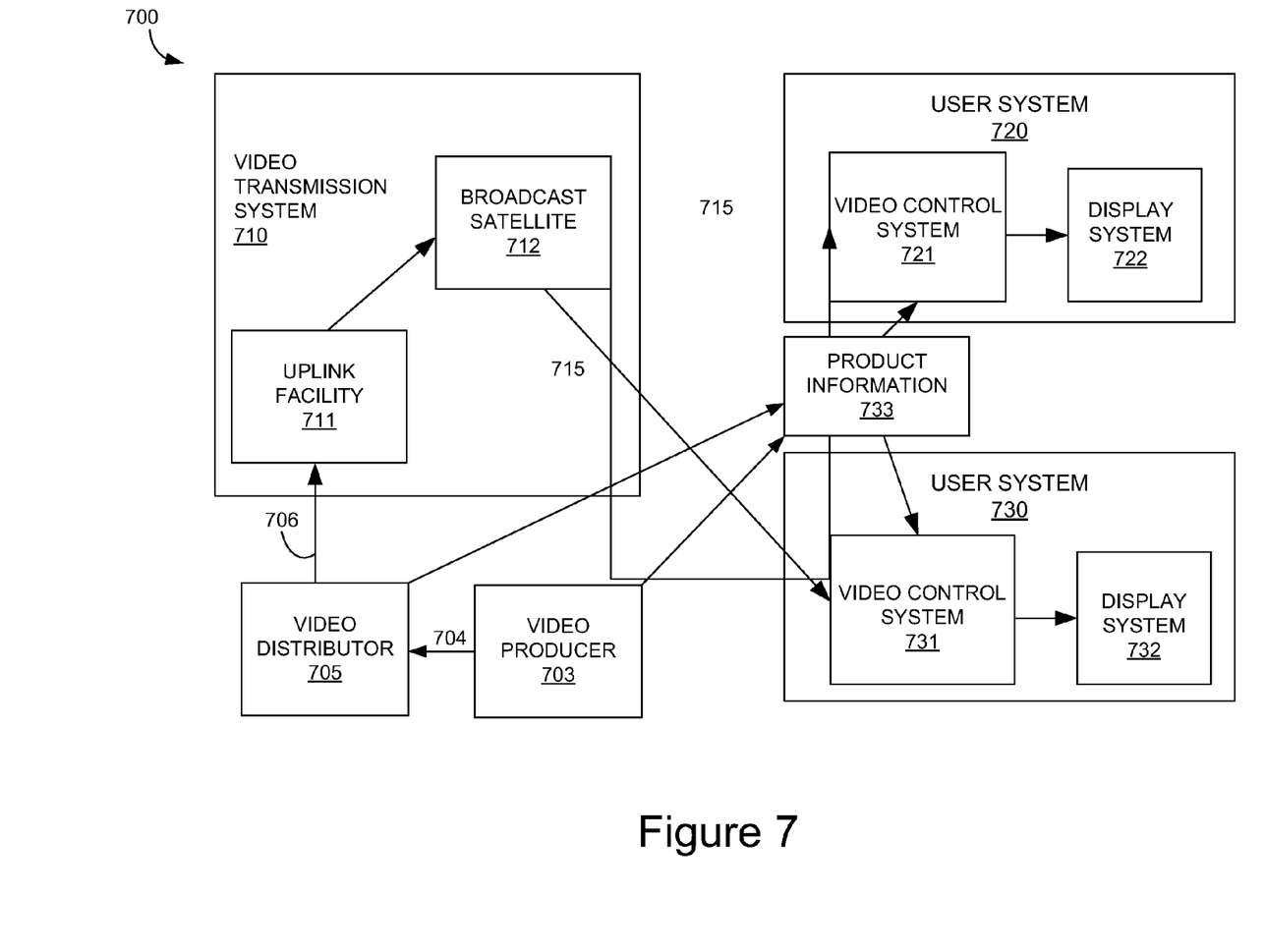
FIG. 7 is a block diagram of a satellite broadcast communication network in an embodiment of the invention.

FIG. 7 is a block diagram of a satellite broadcast communication network in an embodiment of the invention. This example embodiment shows more detail in the front end of an exemplary satellite broadcast communication network. Satellite broadcast communication network 700 includes video transmission system 710, user system 720, and user system 730. User system 720 includes video control system 721 and display system 722. User system 730 includes video control system 731 and display system 732. The video transmission system 710 includes an uplink facility 711 and a broadcast satellite 712, and receives programming 706 from one or more video distributor 705. The video distributor 705 may receive video products 704 from one or more video producer 703.

In operation, video transmission system 710 transmits or broadcasts a broadcast communication 715 to user systems 720 and 730. Broadcast communication 715 could include video products and product information associated with the video products.

Video control systems 721 and 731 receive and process broadcast communication 715 to filter the video products based on the product information associated with the video products. If video products are allowed, video control systems 721 and 731 transfer the video products to display system 722 and 732 respectively for display. If the video products are not allowed, video control systems 721 and 731 block, or otherwise filter, the video products.

For exemplary purposes, FIG. 7 shows some possible locations where product information 733 associated with the video products may be generated and optionally merged with the video products. For example, the video distributor 705 may receive video products 704 from one or more video producer 703. The video producer 703 may include an intended viewing context with their video products 704. The video distributor 705 may then modify the intended viewing context (or create new intended viewing context) and include it with the programming 706 sent to the uplink facility 711, or may provide the product information 733 to the users in a variety of other methods, such as an online database, email, or any of a wide variety of other methods for data distribution known to those of skill in the art, all within the scope of the present invention. At any point in the supply chain from the video producer 703 to the broadcast satellite 712, intended viewing context information may be created, modified, or merged with the final broadcast communication sent to the customers. The viewing context information may also be created as an ancillary product by third parties not necessarily related to the video producer 703 or video distributor 705, or as a combination of information from one or more sources.

Figure 8:
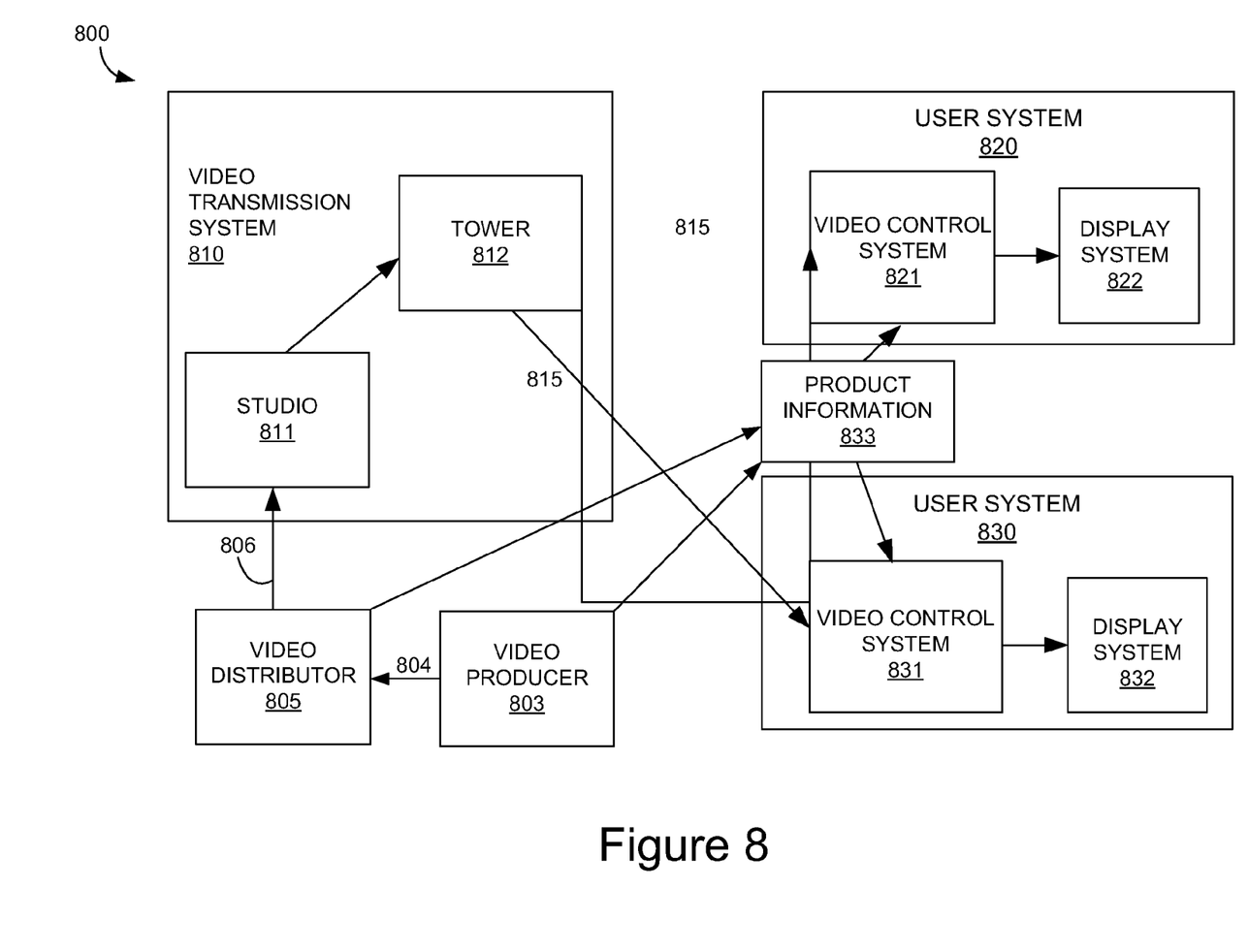
FIG. 8 is a block diagram of a terrestrial broadcast communication network in an embodiment of the invention.

FIG. 8 is a block diagram of a terrestrial broadcast communication network in an embodiment of the invention. This example embodiment shows more detail in the front end of an exemplary terrestrial broadcast communication network. Terrestrial broadcast communication network 800 includes video transmission system 810, user system 820, and user system 830. User system 820 includes video control system 821 and display system 822. User system 830 includes video control system 831 and display system 832. The video transmission system 810 includes a studio 811 and a tower 812, and receives programming 806 from one or more video distributor 805. The video distributor 805 may receive video products 804 from one or more video producer 803.

In operation, video transmission system 810 transmits or broadcasts a broadcast communication 815 to user systems 820 and 830. Broadcast communication 815 could include video products and product information associated with the video products.

Video control systems 821 and 831 receive and process broadcast communication 815 to filter the video products based on the product information associated with the video products. If video products are allowed, video control systems 821 and 831 transfer the video products to display system 822 and 832 respectively for display. If the video products are not allowed, video control systems 821 and 831 block, or otherwise filter, the video products.

For exemplary purposes, FIG. 8 shows some possible locations where product information 833 associated with the video products may be generated and optionally merged with the video products. For example, the video distributor 805 may receive video products 804 from one or more video producer 803. The video producer 803 may include an intended viewing context with their video products 804. The video distributor 805 may then modify the intended viewing context (or create new intended viewing context) and include it with the programming 806 sent to the studio 811, or may provide the product information 833 to the users in a variety of other methods, such as an online database, email, or any of a wide variety of other methods for data distribution known to those of skill in the art, all within the scope of the present invention. At any point in the supply chain from the video producer 803 to the tower 812, intended viewing context information may be created, modified, or merged with the final broadcast communication sent to the customers. The viewing context information may also be created as an ancillary product by third parties not necessarily related to the video producer 803 or video distributor 805, or as a combination of information from one or more sources.

Figure 9:
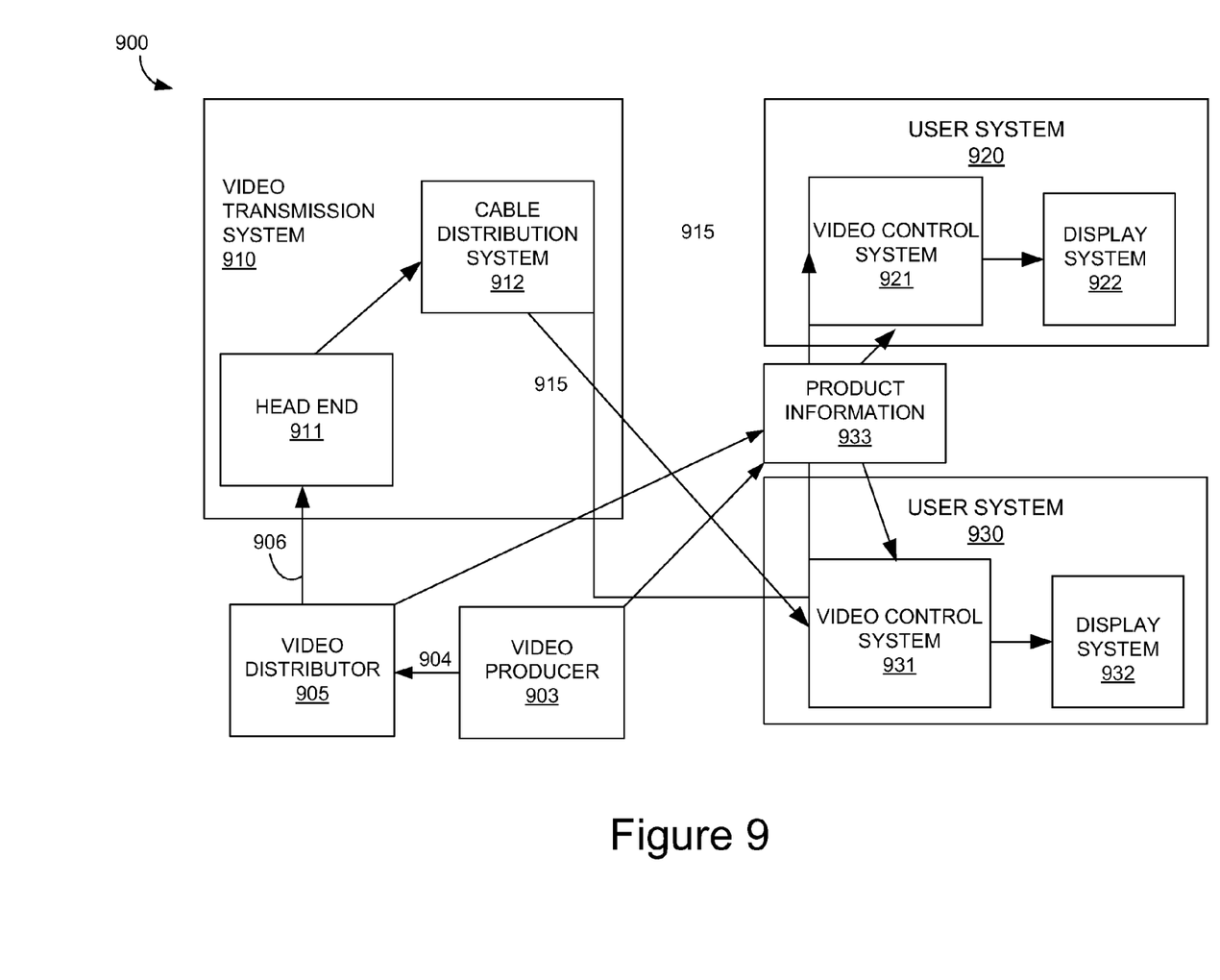
FIG. 9 is a block diagram of a cable broadcast communication network in an embodiment of the invention.

FIG. 9 is a block diagram of a cable broadcast communication network in an embodiment of the invention. This example embodiment shows more detail in the front end of an exemplary cable broadcast communication network. Cable broadcast communication network 900 includes video transmission system 910, user system 920, and user system 930. User system 920 includes video control system 921 and display system 922. User system 930 includes video control system 931 and display system 932. The video transmission system 910 includes a head end 911 and a cable distribution system 912, and receives programming 906 from one or more video distributor 905. The video distributor 905 may receive video products 904 from one or more video producer 903.

In operation, video transmission system 910 transmits or broadcasts a broadcast communication 915 to user systems 920 and 930. Broadcast communication 915 could include video products and product information associated with the video products.

Video control systems 921 and 931 receive and process broadcast communication 915 to filter the video products based on the product information associated with the video products. If video products are allowed, video control systems 921 and 931 transfer the video products to display system 922 and 932 respectively for display. If the video products are not allowed, video control systems 921 and 931 block, or otherwise filter, the video products.

For exemplary purposes, FIG. 9 shows some possible locations where product information 933 associated with the video products may be generated and optionally merged with the video products. For example, the video distributor 905 may receive video products 904 from one or more video producer 903. The video producer 903 may include an intended viewing context with their video products 904. The video distributor 905 may then modify the intended viewing context (or create new intended viewing context) and include it with the programming 906 sent to the head end 911, or may provide the product information 933 to the users in a variety of other methods, such as an online database, email, or any of a wide variety of other methods for data distribution known to those of skill in the art, all within the scope of the present invention. At any point in the supply chain from the video producer 903 to the cable distribution system 912, intended viewing context information may be created, modified, or merged with the final broadcast communication sent to the customers. The viewing context information may also be created as an ancillary product by third parties not necessarily related to the video producer 903 or video distributor 905, or as a combination of information from one or more sources.

Those of skill in the art will recognize that a large variety of viewing context information may be used within the scope of the present invention. The examples provided above are not intended to limit the scope of the invention. Rather, they are intended to provide example applications of the present invention.

Figure 10:
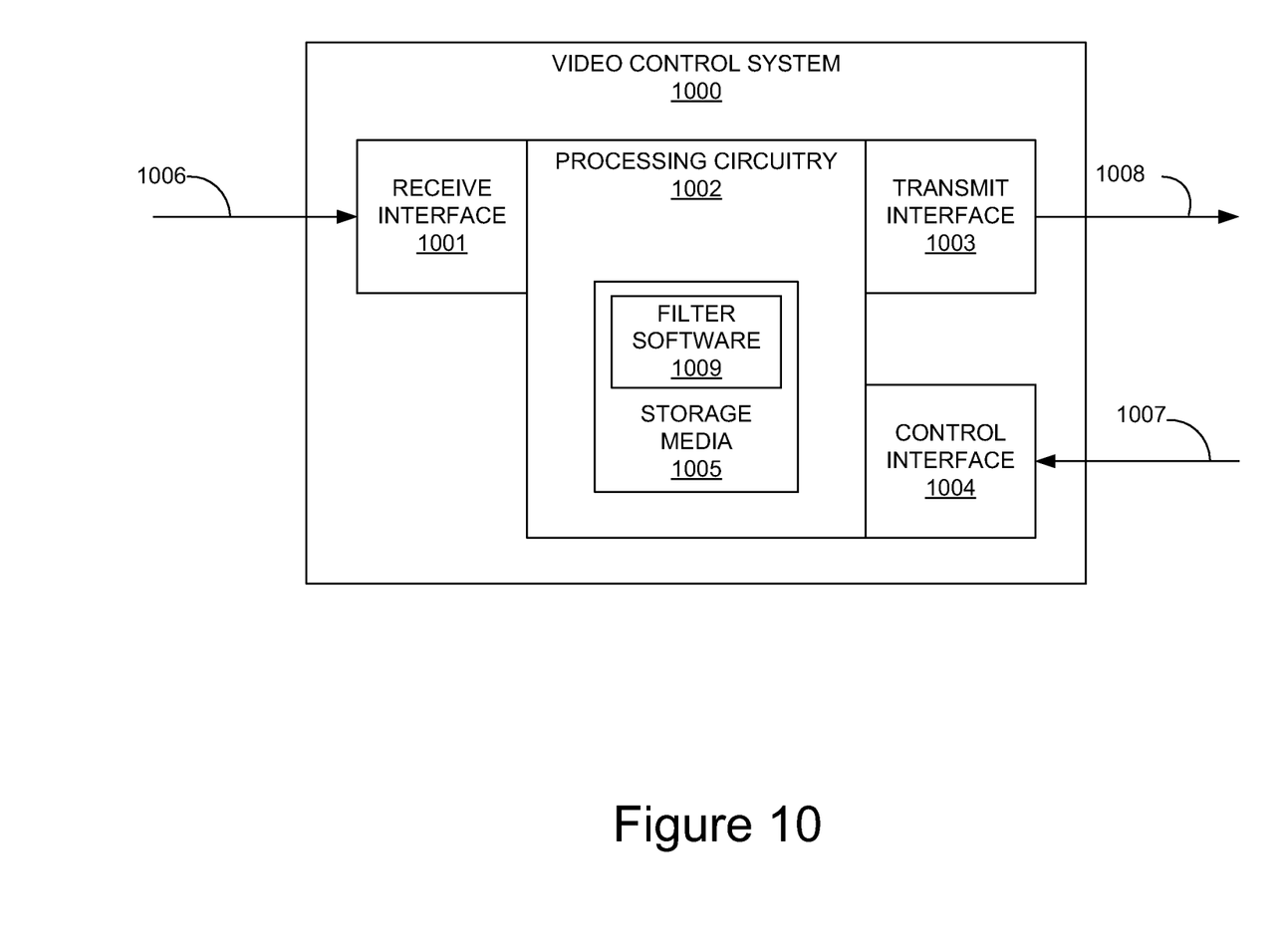
FIG. 10 is a block diagram of a video control system in an embodiment of the invention.

FIG. 10 illustrates video control system 1000 in an embodiment of the invention. Video control system 1000 comprises receive interface 1001, processing circuitry 1002, transmit interface 1003, and control interface 1004. Processing circuitry 1002 includes storage media 1005 that stores filter software 1009.

Receive interface 1001 comprises communication components that receive and transfer video signal 1006 to processing circuitry 1002. Control interface 1004 comprises communication components that receive and transfer user control signal 1007 to processing circuitry 1002. Processing circuitry 1002 processes signals 1006-1007 to transfer video signal 1008 to transmit interface 1003. Transmit interface 1003 comprises communication components that receive and transfer video signal 1008. To interact with the user through control interface 1004, processing circuitry 1002 includes various control information in video signal 1008 for display to the user.

Processing circuitry 1002 retrieves filter software 1009 from storage media 1005. Processing circuitry 1002 processes filter software 1009 and product information from video signal 1006 to provide a filter that blocks specific video products from inclusion in video signal 1008. Processing circuitry 1002 processes filter software 1009 and the product information to automatically modify the filter. Processing circuitry 1002 also processes control signal 1007 and the product information to modify the filter.

Although specific embodiments of the invention have been discussed herein, other embodiments encompassed by the scope of the invention are possible. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method of operating a video control system for displaying video products within a current viewing context, the method comprising:
   receiving a video product via a broadcast communication at the video control system;
   receiving product information for the video product at the video control system;
   processing the product information at the video control system to determine an intended local viewing time for the video product based upon the product information, wherein the intended local viewing time indicates a time of day during which the video product is intended to be viewed as initially produced by a video producer that created a content rating for the video product; and
   filtering the video product at the video control system based on a comparison of a first stringency of rating content at the intended local viewing time and a second stringency of rating content at a current time.

2. The method of claim 1 wherein the intended local viewing time depends upon a time zone in which the video product is intended to be viewed and the current time depends upon a time zone in which the video control system is located.

3. The method of claim 1 wherein the filtering of the video product based on the comparison of the first stringency of rating content at the intended local viewing time and the second stringency of rating content at the current viewing time includes blocking the video product if the intended local viewing time is a late in the day viewing hour and the current time is an earlier in the day viewing hour.

4. The method of claim 1 further comprising filtering the video product based on a comparison of an intended viewing location determined based upon the product information and a current location.

5. The method of claim 1 wherein the product information indicates a rating for the video product and wherein the method further comprises: filtering the video product based on a comparison of the rating for the viewing product and a rating criteria.

6. The method of claim 5 wherein the rating identifies a content label and an intended audience.

7. The method of claim 1 wherein the broadcast communication comprises a satellite broadcast communication.

8. The method of claim 1 wherein the broadcast communication comprises a cable broadcast communication.

9. The method of claim 1 wherein the broadcast communication comprises a terrestrial broadcast communication.

10. A video control system comprising:
    a receive interface configured to receive a video product via a broadcast communication, and to receive product information for the video product; and
    a control interface configured to receive control commands from a user;
    processing circuitry electrically coupled to the receive interface and the control interface, including filtering software and storage media, and configured to process the product information to determine an intended local viewing time for the video product, and to filter the video product based on a comparison of a first stringency of rating content at the intended local viewing time and a second stringency of rating content at a current time, and wherein the intended local viewing time indicates a time of day during which the video product is intended to be viewed as initially produced by a video producer that created a content rating for the video product.

11. The system of claim 10 further comprising: a transmit interface electrically coupled to the processing circuitry, configured to receive filtered video product from the processing circuitry and to send a video signal to a user.

12. The system of claim 10 wherein the processing circuitry is also configured to block the video product if a current viewing context does not satisfy an intended viewing context indicated by the product information.

13. The system of claim 12 wherein the intended viewing context comprises a region, wherein the current viewing context comprises a current location, and wherein the processing circuitry is also configured to block the video product if the current location is not within the region.

14. The system of claim 10 wherein the product information indicates a rating for the video product and wherein the processing circuitry is also configured to filter the video product based on a comparison of the rating for the viewing product and a rating criteria.

15. The system of claim 14 wherein the rating identifies a content label and an intended audience.

16. The system of claim 10 wherein the broadcast communication comprises a satellite broadcast communication.

17. The system of claim 10 wherein the broadcast communication comprises a cable broadcast communication.

18. The system of claim 10 wherein the broadcast communication comprises a terrestrial broadcast communication.

19. The system of claim 10 wherein the intended local viewing time depends on a time zone in which the video product is intended to be viewed and the current time depends on a time zone in which the video control system is located.

20. The system of claim 10 wherein the processing circuitry is further configured to block the video product if the intended local viewing time is a late in the day viewing hour and the current time is an earlier in the day viewing hour.

* * * * *